T. EARLE.
Apparatus for Beating Eggs.
No. 225,003.  Patented Mar. 2, 1880.
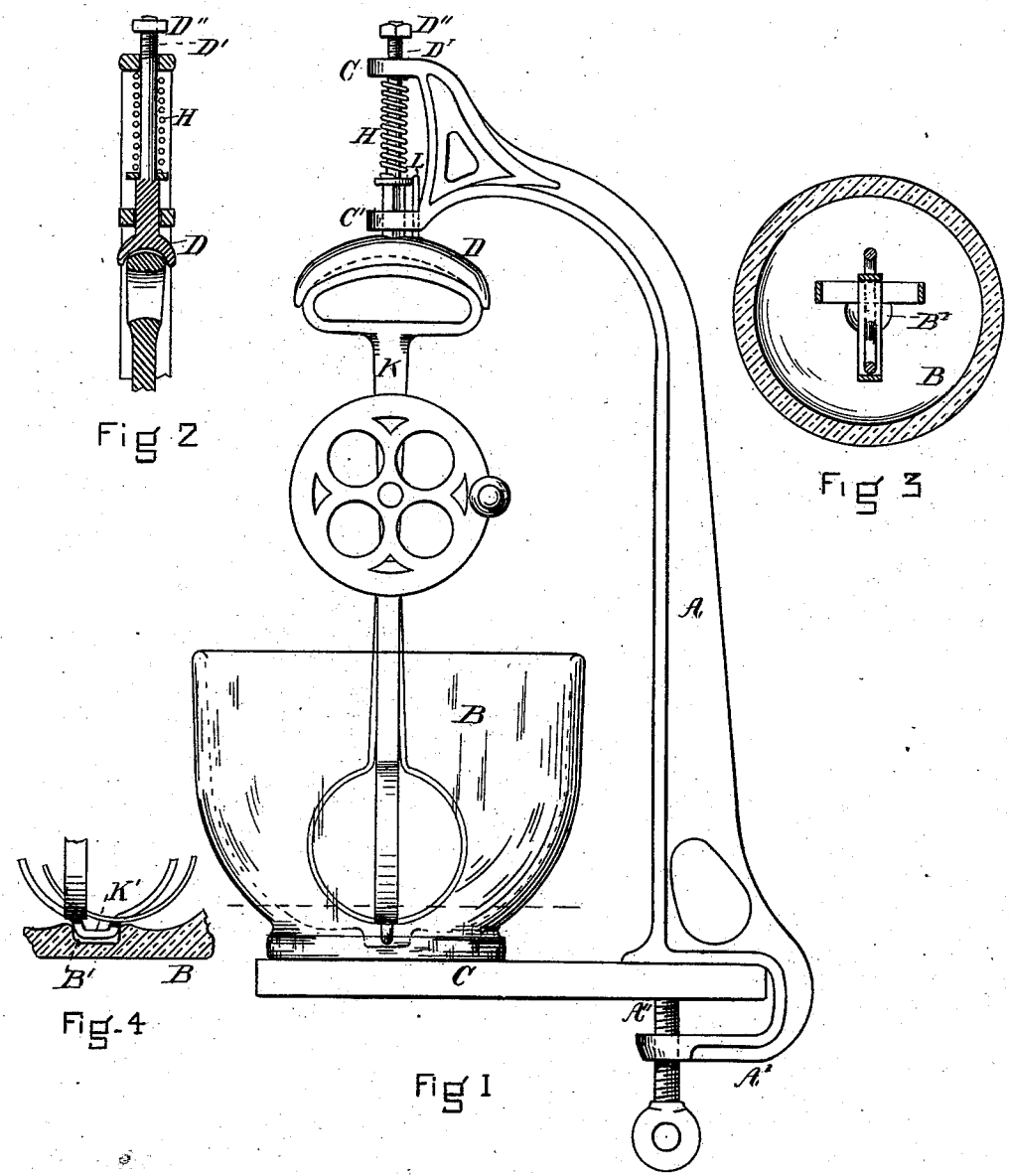

UNITED STATES PATENT OFFICE.

TIMOTHY EARLE, OF VALLEY FALLS, RHODE ISLAND.

APPARATUS FOR BEATING EGGS.

SPECIFICATION forming part of Letters Patent No. 225,003, dated March 2, 1880.

Application filed January 28, 1880.

*To all whom it may concern:*

Be it known that I, TIMOTHY EARLE, of Valley Falls, in the county of Providence and State of Rhode Island, have invented a new and useful Improvement in Apparatus for Beating Eggs, of which the following is a specification.

My invention relates more particularly to the device for holding the egg-beater proper; and it consists in a frame which is to be attached to any suitable table or bench. The upper end of this frame is so constructed as to readily engage with the upper end of the egg-beater and to hold it in place. The lower end of the beater rests in a sinkage made in the bottom of a vessel containing the substance to be beaten.

In the drawings, Figure 1 is a side elevation of my entire device, showing a portion of the table and the bowl for holding the egg or other substance to be beaten. Fig. 2 is a vertical section to show more clearly the device for holding the top of the beater. Fig. 3 is a view of the interior of the bowl, showing also a part of the beater in section. Fig. 4 is a section of a part of the bottom of the bowl and beater.

A represents the holding-frame, which has at the lower end a yoke, A', and binding-screw A'', for the purpose of fastening it to the table or bench C. The upper end terminates in a fork, C C'. A spindle, D', passes through parts C C', as shown in Figs. 1 and 2, and terminates in a crescent-shaped piece, D, the under side of which is hollowed out, as shown in Figs. 1 and 2, so as to receive the handle of the beater K. The spindle D' and crescent D are forced down by the spring H, their downward motion, when not resting on the handle of the beater, being limited by the nut D''.

The bowl B may be of any suitable material and of any desired form and size.

The peculiarity of the bowl is that I form a recess at B' in the center of the bottom. This recess receives the projecting stationary end K' of the frame of the beater proper. (See Fig. 4.)

When the bowl is not in use it can be slipped out, for as soon as the bowl is removed from a position out of the perpendicular in relation to the holding-frame A, then the beater K will be free from the crescent D and can be removed. To replace the bowl and beater the bowl is set on the table C, but not directly under the top of the holding-frame. Now the top of the beater K is placed in contact with crescent D. The lower end is placed in the bowl, and the whole is moved so as to be perpendicularly under the crescent D.

To prevent the spindle D' of the crescent D from turning, its lower end may be made square or flat in shape, or it may be round and have a steady-pin, L, as shown in Fig. 1.

I claim—

1. In an egg-beating device, the combination of the frame A, yielding crescent D, and the egg-beater proper, K, substantially as described, and for the purpose set forth.

2. In an egg-beating device, the combination of the bowl B, having a sinkage, B', with the frame K' of the beater proper, substantially as described, and for the purpose set forth.

TIMOTHY EARLE.

Witnesses:
CHAS. P. NYE,
T. C. CHALK.